(12) United States Patent
Mahajan et al.

(10) Patent No.: US 12,170,008 B2
(45) Date of Patent: Dec. 17, 2024

(54) REMOTE ACTIVATION OR DEACTIVATION OF A DEVICE FOR THEFT DETERRENCE

(71) Applicant: QUALCOMM Incorporated, San Diego, CA (US)

(72) Inventors: Amit Mahajan, San Diego, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/658,437

(22) Filed: Apr. 7, 2022

(65) Prior Publication Data

US 2023/0326312 A1 Oct. 12, 2023

(51) Int. Cl.
*G08B 13/22* (2006.01)
*H04W 4/029* (2018.01)

(52) U.S. Cl.
CPC ............ *G08B 13/22* (2013.01); *H04W 4/029* (2018.02)

(58) Field of Classification Search
CPC ............................... G08B 13/22; H04W 4/029
See application file for complete search history.

(56) References Cited

U.S. PATENT DOCUMENTS

| | | | | |
|---|---|---|---|---|
| 2006/0071783 | A1* | 4/2006 | Culpepper | G08B 21/0269 340/539.13 |
| 2017/0286892 | A1* | 10/2017 | Studnicka | G06Q 20/3224 |
| 2017/0323545 | A1 | 11/2017 | Gillen et al. | |
| 2019/0325719 | A1* | 10/2019 | Bender | G08B 5/36 |
| 2022/0028196 | A1* | 1/2022 | Adams | G08B 13/1427 |

OTHER PUBLICATIONS

International Search Report and Written Opinion—PCT/US2023/061383—ISA/EPO—May 30, 2023.

* cited by examiner

*Primary Examiner* — James J Yang
(74) *Attorney, Agent, or Firm* — QUALCOMM Incorporated

(57) ABSTRACT

In some aspects, a server device may obtain information relating to a location of a device that is to be delivered to a physical location associated with a recipient. The server device may transmit, based at least in part on the information indicating that the location of the device is at the physical location of the recipient, a first communication prompting the recipient to indicate whether the recipient is in possession of the device. The server device may receive a second communication indicating whether the recipient is in possession of the device. The server device may transmit a signal to cause a change of an activation state of one or more operations of the device based at least in part on whether the second communication indicates that the recipient is in possession of the device. Numerous other aspects are described.

30 Claims, 8 Drawing Sheets

100

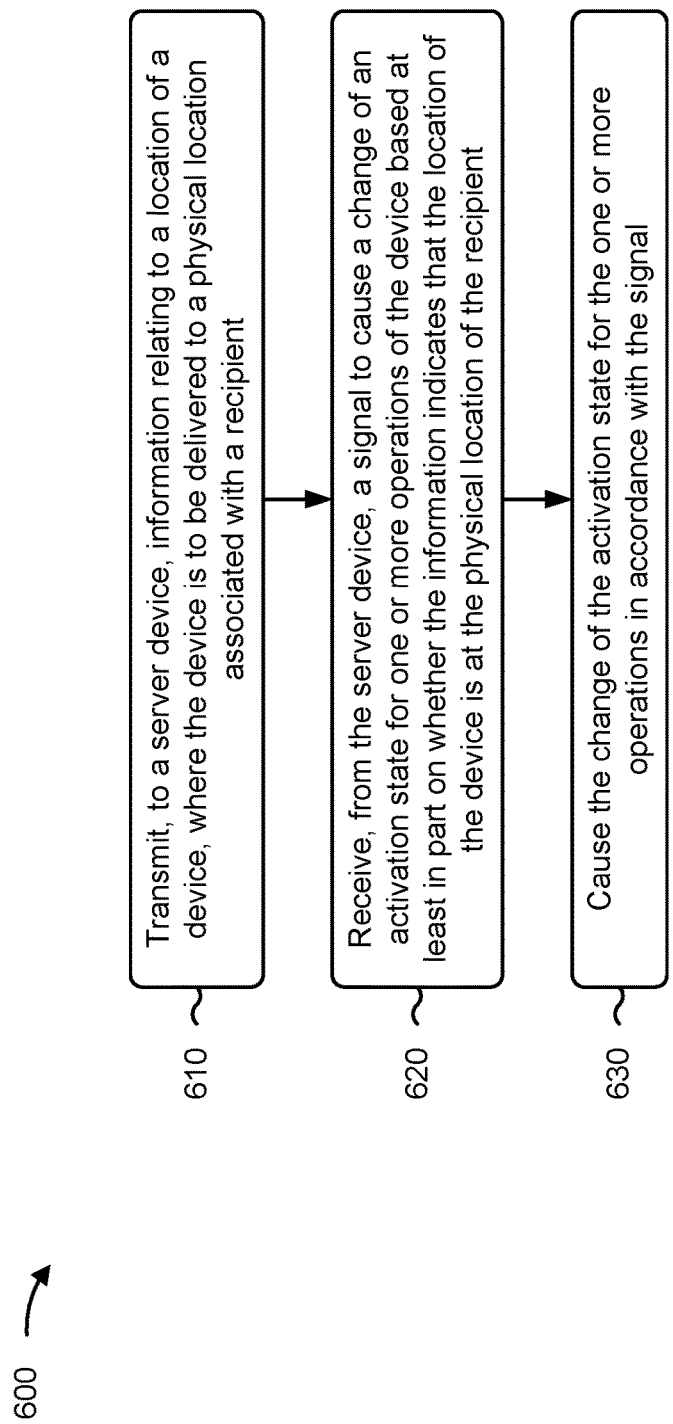

REMOTE ACTIVATION OR DEACTIVATION OF A DEVICE FOR THEFT DETERRENCE

FIELD OF THE DISCLOSURE

Aspects of the present disclosure generally relate to wireless communication and, for example, to remote activation or deactivation of a device.

BACKGROUND

A package may be delivered to a house or a business. For example, if no one is available to receive the package, the package may be left near a door, near a mailbox, or the like. Thus, the package, or the contents thereof, may be an easy target for theft if the package is left unattended.

SUMMARY

Some aspects described herein relate to a method. The method may include obtaining, by a server device, information relating to a location of a device that is to be delivered to a physical location associated with a recipient. The method may include transmitting, by the server device to a user device of the recipient and based at least in part on the information indicating that the location of the device is at the physical location of the recipient, a first communication prompting the recipient to indicate whether the recipient is in possession of the device. The method may include receiving, by the server device from the user device, a second communication indicating whether the recipient is in possession of the device. The method may include transmitting, by the server device to the device, a signal to cause a change of an activation state of one or more operations of the device based at least in part on whether the second communication indicates that the recipient is in possession of the device.

Some aspects described herein relate to a server device. The server device may include a memory and one or more processors coupled to the memory. The one or more processors may be configured to obtain information relating to a location of a device that is to be delivered to a physical location associated with a recipient. The one or more processors may be configured to determine whether the information indicates that the location of the device is at the physical location of the recipient. The one or more processors may be configured to transmit, to the device, a signal to cause a change of an activation state for one or more operations of the device based at least in part on whether the information indicates that the location of the device is at the physical location of the recipient.

Some aspects described herein relate to a non-transitory computer-readable medium that stores a set of instructions. The set of instructions, when executed by one or more processors of the device, may cause a device to transmit, to a server device, information relating to a location of the device. The set of instructions, when executed by one or more processors of the device, may cause the device to receive, from the server device, a signal to cause a change of an activation state for one or more operations of the device based at least in part on whether the information indicates that the location of the device is at the physical location of the recipient. The set of instructions, when executed by one or more processors of the device, may cause the device to cause the change of the activation state for the one or more operations in accordance with the signal.

Some aspects described herein relate to an apparatus. The apparatus may include means for transmitting, to a server device, information relating to a location of the apparatus, where the apparatus is to be delivered to a physical location associated with a recipient. The apparatus may include means for receiving, from the server device, a signal to cause a change of an activation state for one or more operations of the apparatus. The apparatus may include means for causing the change of the activation state for the one or more operations in accordance with the signal.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-6 are flowcharts of example processes associated with remote activation or deactivation of a device, in accordance with the present disclosure.

DETAILED DESCRIPTION

Figure 1:
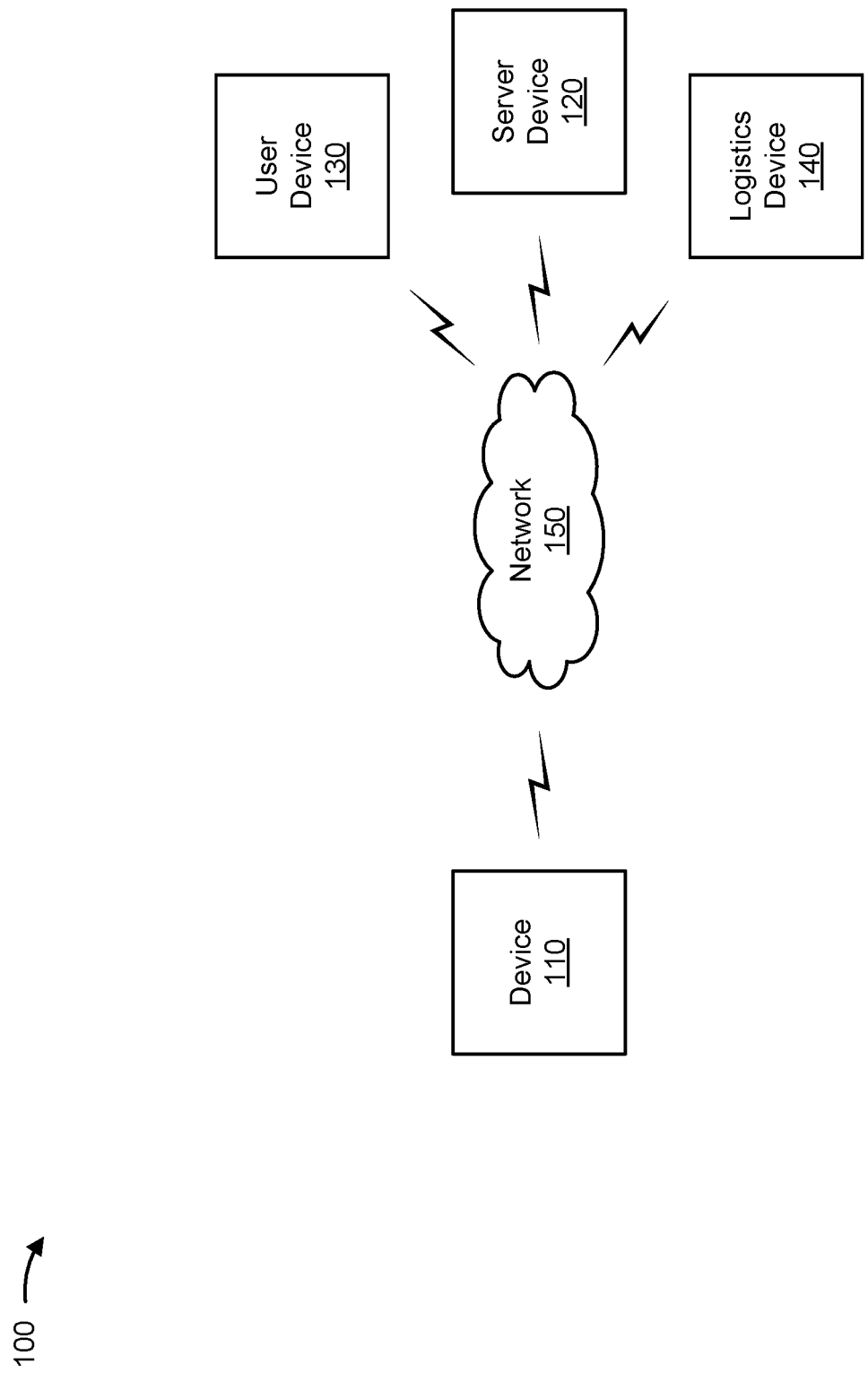
FIG. 1 is a diagram illustrating an example environment in which remote activation or deactivation of a device described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A device, such as an electronic device, may be capable of one or more operations that can be activated or deactivated. For example, a wireless communication device may be deactivated, where the device is incapable of powering on, incapable of wireless communication, or the like, or the wireless communication device may be activated, where the device is capable of powering on, capable of wireless communication, or the like. In some examples, a device may be shipped, in an activated state, for delivery to an individual or business that is an intended recipient (e.g., a purchaser) of the device.

However, during transit of the device to the intended recipient, and particularly if the device is delivered and left outside of a building associated with the individual or business, the device may be taken (e.g., stolen) by an unauthorized individual. Moreover, if the device is activated, any individual in possession of the device may use the device. Unauthorized use of the device may expend resources, such as computing resources of the device, battery resources of the device, network resources used for communication of the device, or the like, that would otherwise be conserved if the device is deactivated when unauthorized use of the device is attempted. However, identifying an appropriate timing for activating and/or deactivating the device without interfering with authorized use of the device by the intended recipient, particularly if the activation/deactivation is to be achieved remotely, is technically difficult.

Some techniques and apparatuses described herein enable remote activation and/or deactivation of a device. In some aspects, following shipment of the device to a recipient, a server device may obtain information relating to a location of the device. Based at least in part on the information indicating that the location of the device is at a physical location associated with the recipient, the server device may transmit a first communication, to a user device of the recipient, prompting the recipient to indicate whether the device is in the possession of the recipient. The server device may receive a second communication from the user device indicating whether the device is in the possession of the recipient. In some aspects, the device may be shipped to the recipient in a deactivated state, and the server device may transmit a signal to the device to cause activation of the device based at least in part on the second communication indicating that the device is in possession of the recipient.

In this way, the device may be activated once the device is in the possession of the intended recipient, thereby timing the activation to avoid interfering with authorized use of the device and avoiding excessive downtime of the device. Similarly, the device may be deactivated if the device is in the possession of an unauthorized individual, thereby conserving computing resources of the device, battery resources of the device, network resources used for communication of the device, or the like, that would be expended by unauthorized use of the device.

FIG. 1 is a diagram illustrating an example environment 100 in which remote activation or deactivation of a device described herein may be implemented, in accordance with the present disclosure. As shown in FIG. 1, environment 100 may include a device 110, a server device 120, a user device 130, a logistics device 140, and a network 150. Devices of environment 100 may interconnect via wired connections, wireless connections, or a combination of wired and wireless connections.

The device 110 includes one or more devices capable of receiving, generating, storing, processing, and/or providing information associated with remote activation or deactivation of the device 110, as described elsewhere herein. In some aspects, the device may be an electronic device that is capable of powering on or powering off, or that is otherwise configured to allow or prevent use of one or more operations of the device. For example, the device may be a power drill, headphones, a blender, or the like. In some aspects, the device 110 may include a communication device and/or a computing device. For example, the device 110 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some aspects, the device 110 may be included in a shipment that is intended to be delivered to a physical location associated with a recipient.

The server device 120 includes one or more devices capable of receiving, generating, storing, processing, providing, and/or routing information associated with remote activation or deactivation of the device 110, as described elsewhere herein. The server device 120 may include a communication device and/or a computing device. For example, the server device 120 may include a server, such as an application server, a client server, a web server, a database server, a host server, a proxy server, a virtual server (e.g., executing on computing hardware), or a server in a cloud computing system. In some aspects, the server device 120 includes computing hardware used in a cloud computing environment.

The user device 130 includes one or more devices capable of receiving, generating, storing, processing, and/or providing information associated with remote activation or deactivation of the device 110, as described elsewhere herein. The user device 130 may include a communication device and/or a computing device. For example, the user device 130 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 130 may be associated with the recipient for the device 110.

The logistics device 140 includes one or more devices capable of receiving, generating, storing, processing, providing, and/or routing information associated with shipment tracking information relating to the device 110, as described elsewhere herein. The logistics device 140 may include a communication device and/or a computing device. For example, the logistics device 140 may include a server, such as an application server, a client server, a web server, a database server, a host server, a proxy server, a virtual server (e.g., executing on computing hardware), or a server in a cloud computing system. In some aspects, the logistics device 140 includes computing hardware used in a cloud computing environment.

The network 150 includes one or more wired and/or wireless networks. For example, the network 150 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 150 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
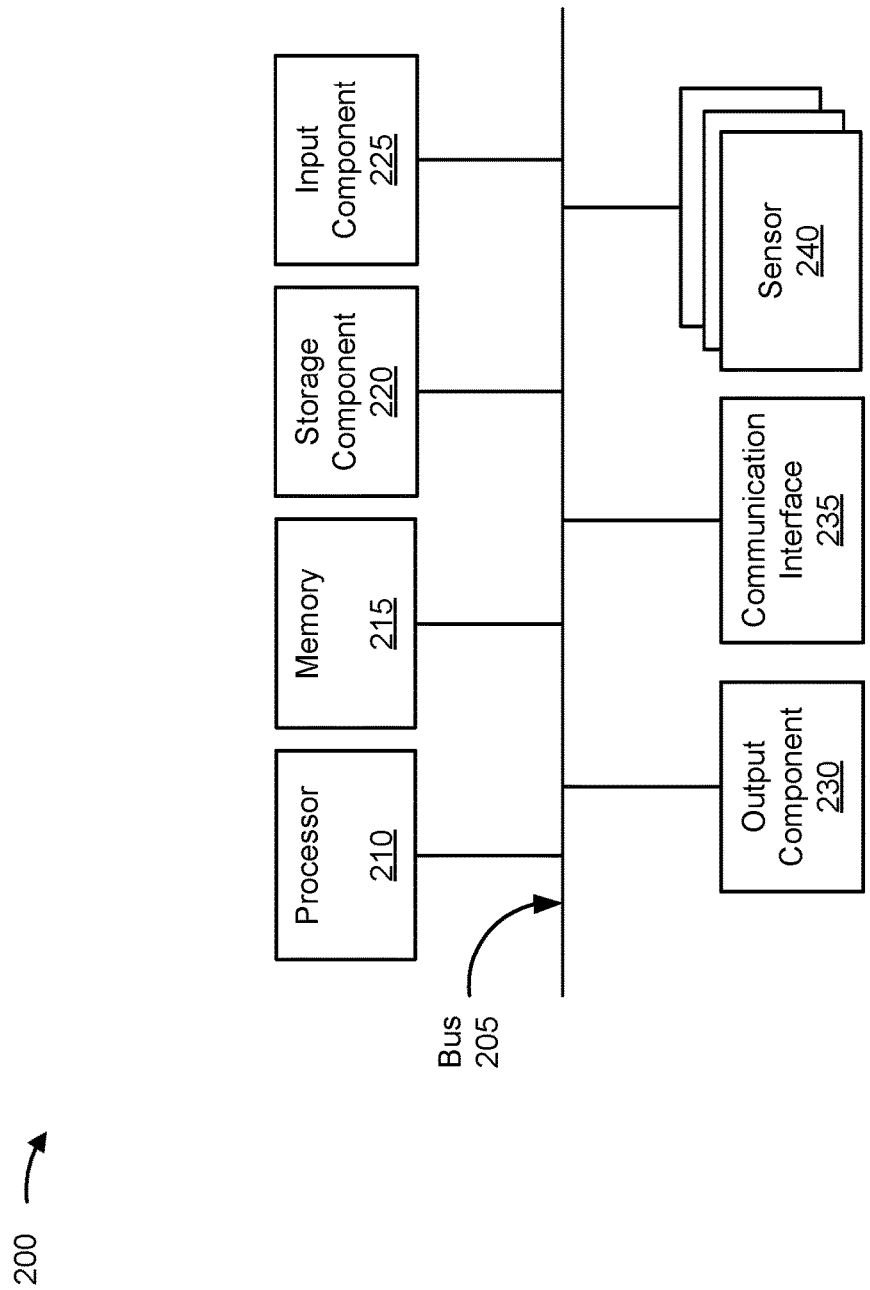
FIG. 2 is a diagram illustrating example components of a device, in accordance with the present disclosure.

FIG. 2 is a diagram illustrating example components of a device 200, in accordance with the present disclosure. Device 200 may correspond to device 110, server device 120, user device 130, and/or logistics device 140. In some aspects, device 110, server device 120, user device 130, and/or logistics device 140 may include one or more devices 200 and/or one or more components of device 200. As shown in FIG. 2, device 200 may include a bus 205, a processor 210, a memory 215, a storage component 220, an input component 225, an output component 230, a communication interface 235, and/or a sensor 240.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Sensor 240 includes one or more wired or wireless devices capable of detecting a condition or information and providing an indication of the detected condition or information. For example, the sensor 240 may include an accelerometer, a gyroscope, a global positioning system (GPS), a global navigation satellite system (GNSS), or the like.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for obtaining information relating to a location of a device that is to be delivered to a physical location associated with a recipient; means for transmitting, to a user device of the recipient and based at least in part on the information indicating that the location of the device is at the physical location of the recipient, a first communication prompting the recipient to indicate whether the recipient is in possession of the device; means for receiving, from the user device, a second communication indicating whether the recipient is in possession of the device; means for transmitting, to the device, a signal to cause a change of an activation state of one or more operations of the device based at least in part on whether the second communication indicates that the recipient is in possession of the device; or the like. As another example, device 200 may include means for obtaining information relating to a location of a device that is to be delivered to a physical location associated with a recipient; means for determining whether the information indicates that the location of the device is at the physical location of the recipient; means for transmitting, to the device, a signal to cause a change of an activation state for one or more operations of the device based at least in part on whether the information indicates that the location of the device is at the physical location of the recipient; or the like. As a further example, device 200 may include means for transmitting, to a server device, information relating to a location of device 200, where device 200 is to be delivered to a physical location associated with a recipient; means for receiving, from the server device, a signal to cause a change of an activation state for one or more operations of device 200; means for causing the change of the activation state for the one or more operations in accordance with the signal; or the like. In some aspects, such means may include one or more components of device 200 described in connection with FIG. 2, such as bus 205, processor 210, memory 215, storage component 220, input component 225, output component 230, communication interface 235, and/or sensor 240.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
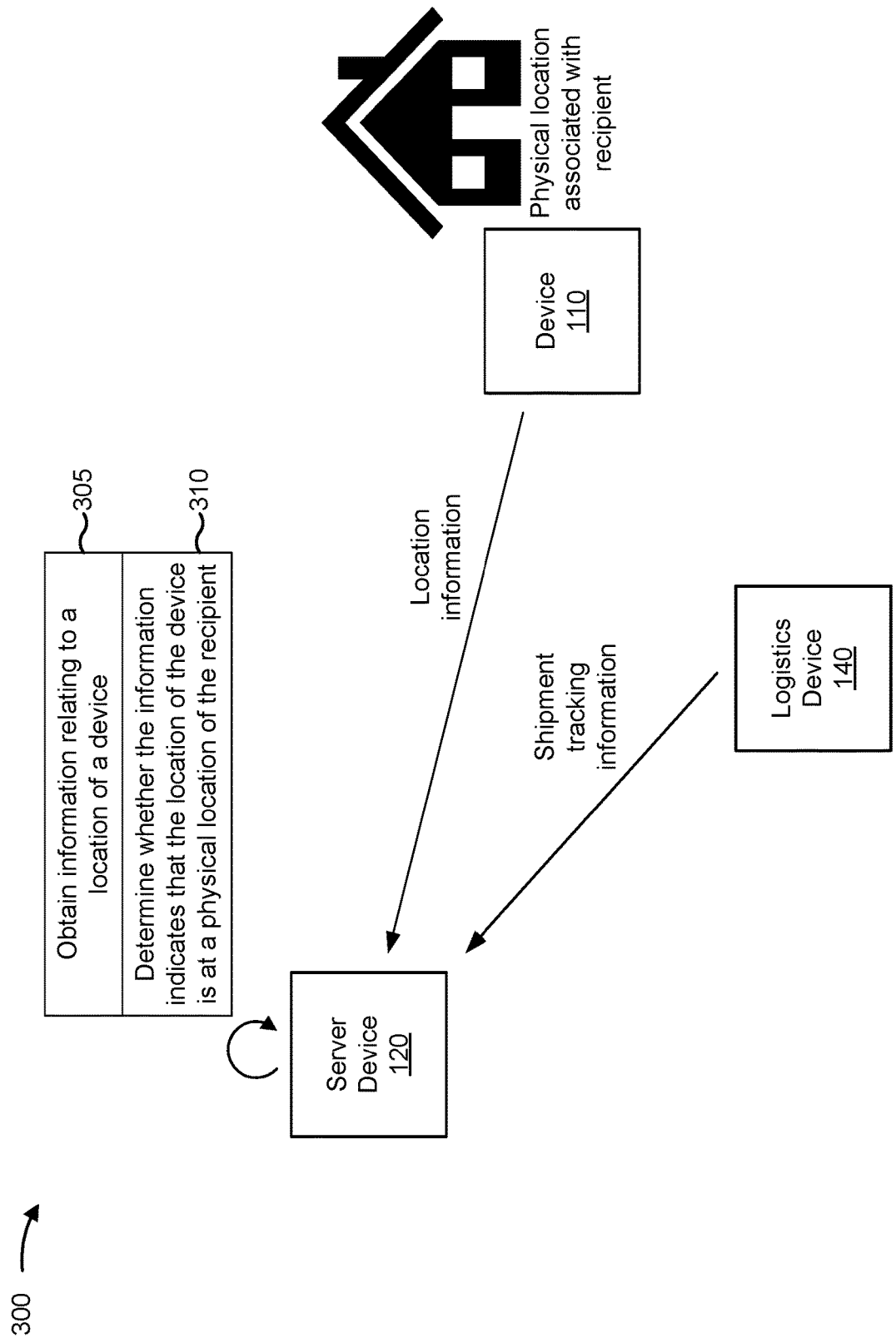
FIGS. 3A-3C are diagrams illustrating an example 300 associated with remote activation or deactivation of a device, in accordance with the present disclosure.
Figure 3B:
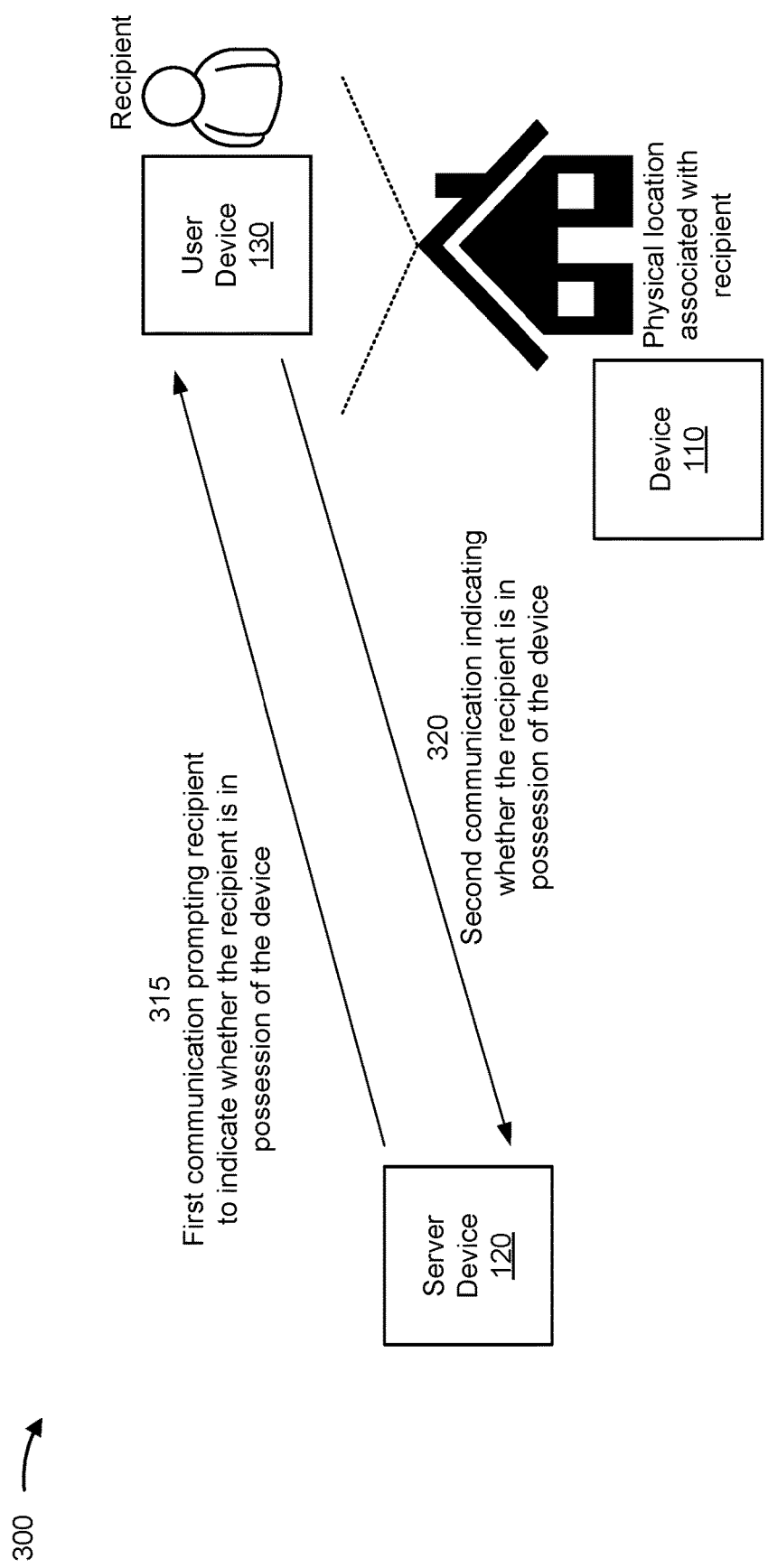
Figure 3C:
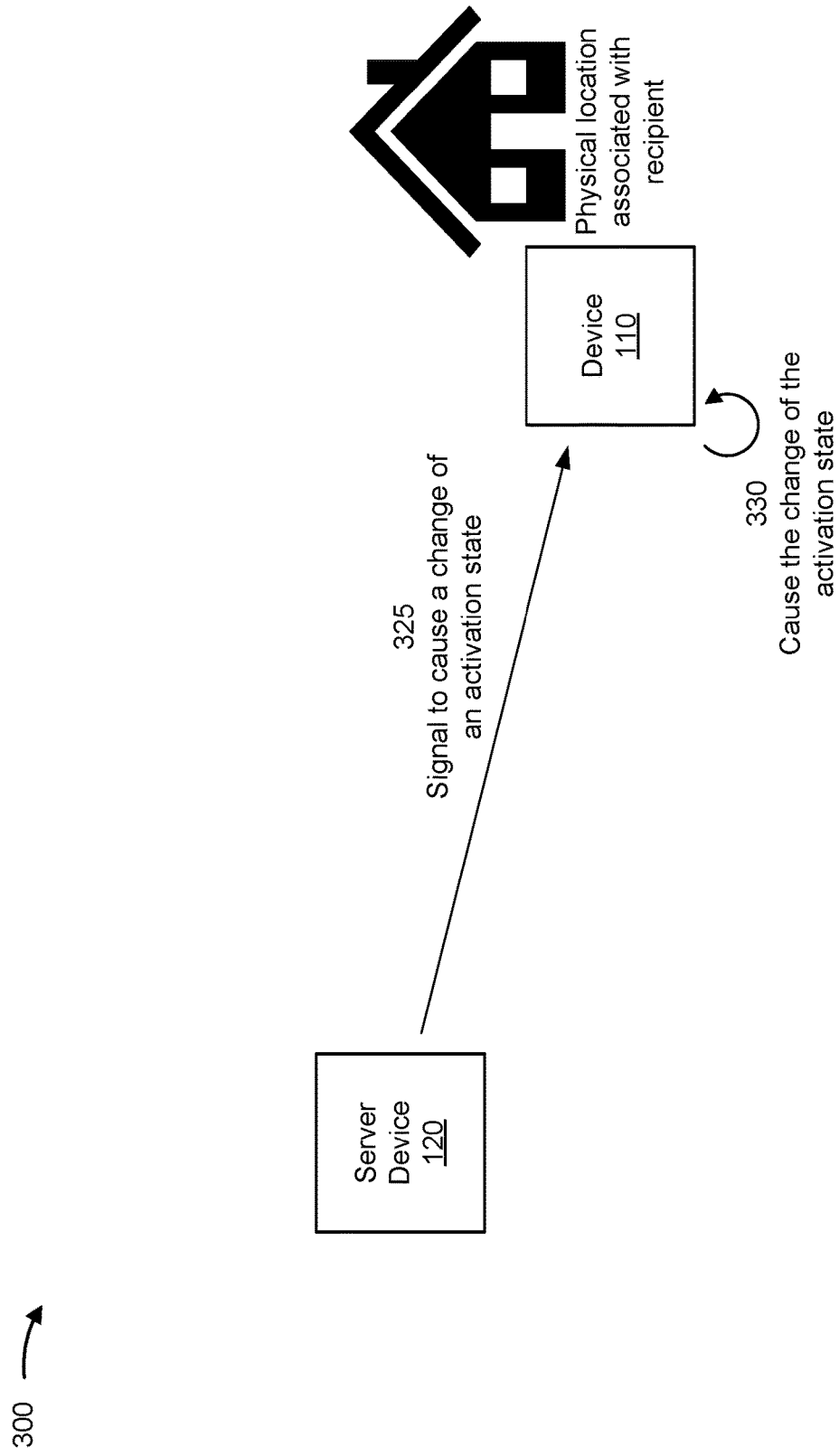

FIGS. 3A-3C are diagrams illustrating an example 300 associated with remote activation or deactivation of a device, in accordance with the present disclosure. As shown in FIGS. 3A-3C, example 300 includes communication between a device 110, a server device 120, a user device 130, and/or a logistics device 140. In some aspects, the device 110 and the server device 120 may communicate via a wireless (e.g., cellular) connection of the device 110. In some aspects, the device 110 may be capable of various operations, such as powering on, connecting to a network, displaying content on a display, or the like.

As described herein, the device 110 may be intended to be delivered to a physical location (e.g., a house, an office building, or the like) associated with a recipient (e.g., the recipient may have purchased or requested the device 110, such as via an online shopping interface). For example, the device 110 (e.g., a package containing the device 110) may be transported (e.g., shipped, mailed, trucked, or carried) to the physical location of the recipient via one or more vehicles, one or more pedestrians, or the like. In some aspects, one or more operations of the device 110 may be deactivated (e.g., powering on of the device may be deactivated) while the device is transported to the physical location of the recipient. In some aspects, while the device is transported to the physical location of the recipient, the device 110 may detect that a remaining battery life of the device is below a threshold, and the device may cause activation of the one or more operations (e.g., to enable use of the device 110 for activation purposes, as described herein, in the event that the battery life of the device is insufficient to last for the duration of the transportation to the recipient).

As shown in FIG. 3A, and by reference number 305, the server device 120 may obtain information relating to a location of the device 110. For example, the server device 120 may obtain the information while the device 110 is transported to the physical location of the recipient, upon delivery of the device 110 to the physical location of the recipient, or the like.

In some aspects, to obtain the information, the server device 120 may receive location information (e.g., geographic coordinates) from the device 110. For example, the device 110 may periodically transmit the location information to the server device 120. As another example, the server device 120 may transmit (e.g., periodically or aperiodically) a request for the location information to the device 110, and the device 110 may transmit the location information to the server device 120 in response to the request. In some aspects, the device 110 may transmit the location information to the server device upon powering on of the device 110. For example, if the device 110 powers off during transport due to insufficient battery life, then the device 110 may transmit the location information to the server device 120 following delivery upon being powered on by the recipient or another individual in possession of the device 110 (e.g., powering on of the device 110 triggers the device 110 to transmit the location information).

In some aspects, to obtain the information, the server device 120 may transmit, to the logistics device 140, a request for shipment tracking information relating to the device 110, and the server device 120 may receive, from the logistics device 140, the shipment tracking information. The server device 120 may transmit the request and/or receive the shipment tracking information via an application programming interface (API) implemented by the logistics device 140. In some aspects, to obtain the information, the server device 120 may receive, from the logistics device 140, the shipment tracking information (e.g., without the server device 120 first transmitting a request). Here, the server device 120 may receive the shipment tracking information periodically or in connection with one or more triggering events, such as a delivery event relating to the device 110.

As shown by reference number 310, the server device 120 may determine whether the information indicates that the location of the device 110 is at the physical location of the recipient. For example, the server device 120 may determine that the location information indicates that the location of the device 110 is at the physical location if the location corresponds to the physical location or if the location is within a threshold distance of the physical location. As another example, the server device 120 may determine that the shipment tracking information indicates that the location of the device 110 is at the physical location if the shipment tracking information indicates a completed delivery.

As shown in FIG. 3B, and by reference number 315, the server device 120 may transmit, to the user device 130 of the recipient, a first communication prompting the recipient to indicate whether the recipient is in possession of the device 110. In some aspects, the server device 120 may transmit the first communication based at least in part on the information indicating that the location of the device 110 is at the physical location of the recipient (e.g., based at least in part on the server device 120 determining that the location of the device 110 is at the physical location of the recipient). In some aspects, the server device 120 may transmit the first communication based at least in part on a powering on of the device 110 (e.g., based at least in part on the server device 120 receiving the information indicating the location when the device 110 is powered on, as described above).

The first communication may be a text message, an email message, a push notification, or a voice call, among other examples. In some aspects, to transmit the first communication, the server device 120 may obtain (e.g., from a database) data relating to the recipient (e.g., a purchase record associated with the device 110, a shipment record associated with the device 110, or the like), and the data may indicate contact information (e.g., a phone number, an email address, a device identifier, or the like) for the user device 130. For example, the recipient may provide the contact information when purchasing the device 110.

As shown by reference number 320, the server device 120 may receive, from the user device 130, a second communication (e.g., in response to the first communication) indicating whether the recipient is in possession of the device 110 (e.g., "yes" or "no"). The second communication may be a text message, an email message, an in-application message, or a voice call, among other examples. In some aspects, the server device 120 may determine that the recipient is not in possession of the device 110 if the second communication is not received within a threshold time of transmission of the first communication, and the server device 120 may deactivate one or more operations of the device 110, as described herein.

As shown in FIG. 3C, and by reference number 325, the server device 120 may transmit, and the device 110 may receive, a signal to cause a change of an activation state for one or more operations of the device 110. The change of the activation state of the one or more operations may be an activation or a deactivation depending on whether the one or more operations were previously activated or deactivated during transportation of the device 110. The one or more operations may be powering on of the device 110, connecting the device 110 to a network, and/or displaying content on a display of the device 110, among other examples. In some aspects, the signal may be transmitted to the device 110 via a wireless (e.g., cellular) connection of the device 110. In this way, the server device 120 may remotely activate or deactivate the device 110 with minimal interruption to authorized use of the device 110.

In some aspects, the server device 110 may transmit the signal based at least in part on whether the second communication indicates that the recipient is in possession of the device 110. For example, if the one or more operations are deactivated prior to the signal being transmitted (e.g., the one or more operations are deactivated while the device is transported to the recipient), then the change of the activation state of the one or more operations may be an activation of the one or more operations if the second communication indicates that the recipient is in possession of the device 110. As another example, if the one or more operations are activated prior to the signal being transmitted (e.g., the one or more operations are activated while the device is transported to the recipient, such as due to a low battery of the device 110, as described above), then the change of the activation state of the one or more operations may be a deactivation of the one or more operations if the second communication indicates that the recipient is not in possession of the device 110.

Additionally, or alternatively, the server device 120 may transmit the signal based at least in part on whether the information indicates that the location of the device 110 is at the physical location of the recipient. For example, if the one or more operations are deactivated prior to the signal being transmitted (e.g., the one or more operations are deactivated while the device is transported to the recipient), then the change of the activation state of the one or more operations may be an activation of the one or more operations if the information indicates that the location of the device 110 is at the physical location of the recipient. Here, the server device 120 may transmit the signal to activate the one or more operations if multiple reports of location information by the device 110 over a threshold time period (e.g., 5 hours, 10 hours, or the like) all indicate that the location of the device 110 is at the physical location of the recipient (e.g., thereby indicating that the device 110 has not been taken by an unauthorized individual). Additionally, or alternatively, the device 110 may report movement information indicating movement of the device 110 (e.g., detected using a gyroscope of the device 110, an accelerometer of the device 110, or the like) to the server device 120 (e.g., starting from when the location of the device 110 is at the physical location of the recipient), and the server device 120 may transmit the signal to activate the one or more operations if the movement of the device 110 is indicative of the recipient taking possession of the device 110 (e.g., slower movement over shorter distances) and/or not indicative of an unauthorized individual taking possession of the device 110 (e.g., faster movement over longer distances). As another example, if the one or more operations are activated prior to the signal being transmitted (e.g., the one or more operations are activated while the device is transported to the recipient, such as due to a low battery of the device 110, as described above), then the change of the activation state of the one or more operations may be a deactivation of the one or more operations if the information indicates that the location of the device 110 is not at the physical location of the recipient. Additionally, or alternatively, the server device 120 may transmit the signal to deactivate the one or more operations if movement information reported by the device 110 indicates that the movement of the device 110 is indicative of an unauthorized individual taking possession of the device 110 and/or is not indicative of the recipient taking possession of the device 110.

In some aspects, if the signal transmitted by the server device 120 is to deactivate the one or more operations of the device 110, the server device 120 also may transmit a message to the user device 130 of the recipient indicating that the one or more operations of the device 110 have been deactivated, indicating that the device 110 is in the possession of an unauthorized individual, or the like.

As shown by reference number 330, the device 110, based at least in part on receiving the signal, may cause the change of the activation state of the one or more operations. For example, the device 110 may activate or deactivate an ability of the device 110 to power on, to connect to a network, and/or to display content on a display, among other examples. In some aspects, the device 110 may use one or more first processors to cause the change of the activation state for the one or more operations, and the device 110 may use one or more second processors to actually perform the one or more operations. In other words, the device 110 may have dedicated hardware (e.g., a communication module and/or a microcontroller unit, among other examples) for communicating with the server device 120 and/or for performing activation/deactivation operations.

In some aspects, the device 110 may determine that the location information indicates that the location of the device 110 is at the physical location of the recipient. Subsequently, the device 110 may detect that the location of the device 110 has moved a threshold distance away from the physical location of the recipient. Here, the device 110 may (e.g., if the recipient did not indicate that the recipient is in possession of the device 110) autonomously deactivate one or more operations of the device 110 based at least in part on detecting that the location of the device 110 has moved the threshold distance. Additionally, or alternatively, the device 110 may (e.g., if the recipient did not indicate that the recipient is in possession of the device 110) transmit, to an alarm device associated with the physical location of the recipient, a signal to trigger an alarm of the alarm device (e.g., to cause an audible siren, to cause an alert to be sent to the user device 130 of the recipient, or the like) based at least in part on detecting that the location of the device 110 has moved the threshold distance. In particular, the device 110 may connect to the same wireless network used by the alarm device when the location of the device 110 is at the physical location of the recipient (e.g., credentials used for accessing the wireless network may be provided by the recipient at a time of purchase and configured for the device 110 before the device 110 is transported to the recipient), thereby enabling communication between the device 110 and the alarm device.

As indicated above, FIGS. 3A-3C are provided as an example. Other examples may differ from what is described with respect to FIGS. 3A-3C.

Figure 4:
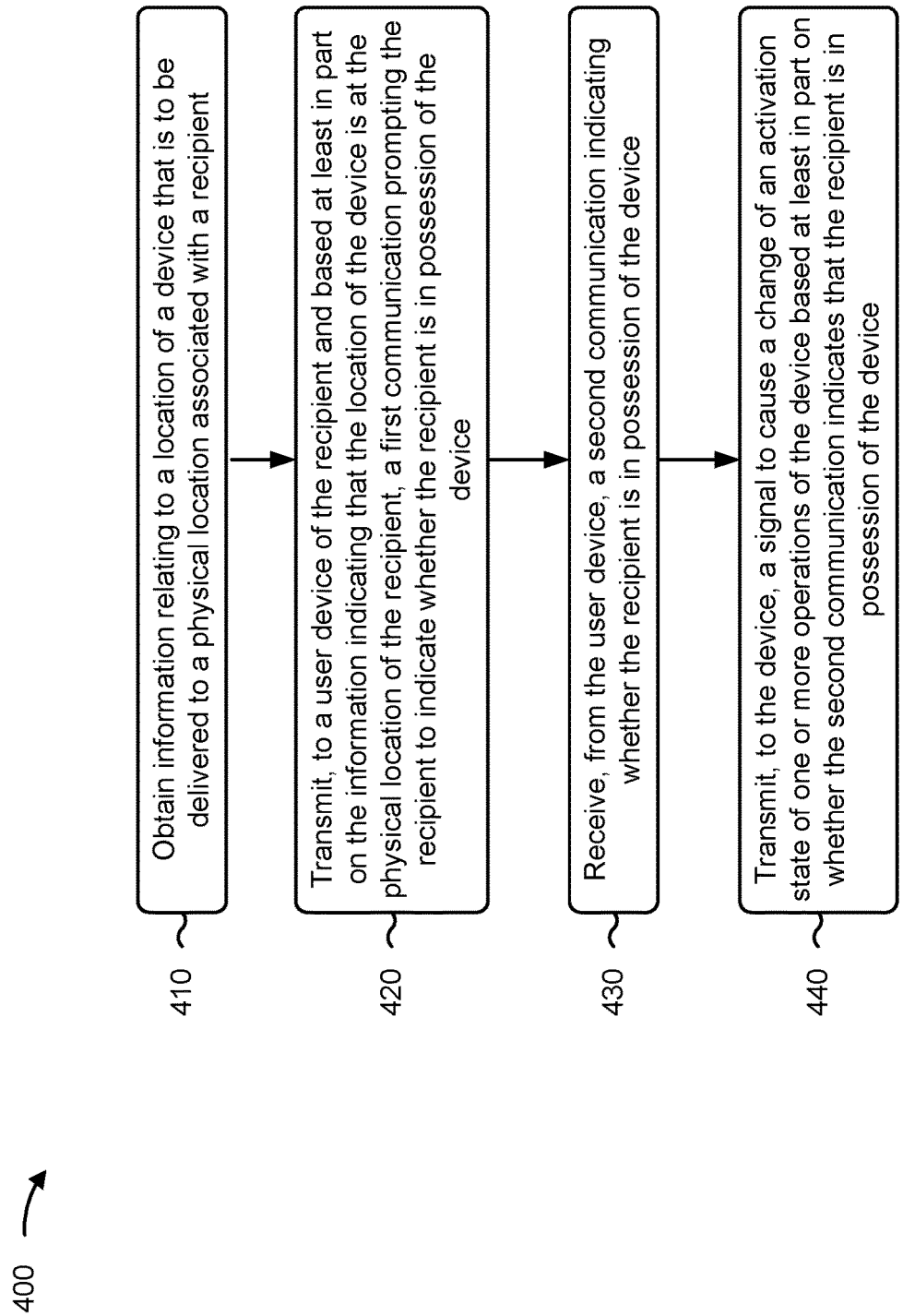

FIG. 4 is a flowchart of an example process 400 associated with remote activation or deactivation of a device. In some aspects, one or more process blocks of FIG. 4 are performed by a server device (e.g., server device 120). In some aspects, one or more process blocks of FIG. 4 are performed by another device or a group of devices separate from or including the server device, such as the device that is to be remotely activated or deactivated (e.g., device 110), a user device (e.g., user device 130), and/or a logistics device (e.g., logistics device 140). Additionally, or alternatively, one or more process blocks of FIG. 4 may be performed by one or more components of device 200, such as processor 210, memory 215, storage component 220, input component 225, output component 230, communication interface 235, and/or sensor 240.

As shown in FIG. 4, process 400 may include obtaining information relating to a location of a device that is to be delivered to a physical location associated with a recipient (block 410). For example, the server device may obtain information relating to a location of a device that is to be delivered to a physical location associated with a recipient, as described above.

As further shown in FIG. 4, process 400 may include transmitting, based at least in part on the information indicating that the location of the device is at the physical location of the recipient, a first communication prompting the recipient to indicate whether the recipient is in possession of the device (block 420). For example, the server device may transmit, based at least in part on the information indicating that the location of the device is at the physical location of the recipient, a first communication prompting the recipient to indicate whether the recipient is in possession of the device, as described above.

As further shown in FIG. 4, process 400 may include receiving a second communication indicating whether the recipient is in possession of the device (block 430). For example, the server device may receive a second communication indicating whether the recipient is in possession of the device, as described above.

As further shown in FIG. 4, process 400 may include transmitting a signal to cause a change of an activation state of one or more operations of the device based at least in part on whether the second communication indicates that the recipient is in possession of the device (block 440). For example, the server device may transmit a signal to cause a change of an activation state of one or more operations of the device based at least in part on whether the second communication indicates that the recipient is in possession of the device, as described above.

Process 400 may include additional aspects, such as any single aspect or any combination of aspects described below and/or in connection with one or more other processes described elsewhere herein.

In a first aspect, an activation state of one or more operations of the device are set to be deactivated prior to the signal being transmitted, and the change of the activation state for the one or more operations is an activation of the one or more operations if the second communication indicates that the recipient is in possession of the device.

In a second aspect, an activation state of one or more operations of the device are set to be activated prior to the signal being transmitted, and the change of the activation state for the one or more operations is a deactivation of the one or more operations if the second communication indicates that the recipient is not in possession of the device.

In a third aspect, alone or in combination with one or more of the first and second aspects, obtaining the information relating to the location of the device includes receiving, from the device, location information for the device.

In a fourth aspect, alone or in combination with one or more of the first through third aspects, obtaining the information relating to the location of the device includes transmitting, to an additional device, a request for shipment tracking information relating to the device, and receiving, from the additional device, the shipment tracking information relating to the device.

In a fifth aspect, alone or in combination with one or more of the first through fourth aspects, at least one of the first communication or the second communication is a text message, an email message, a push notification, or a voice call.

In a sixth aspect, alone or in combination with one or more of the first through fifth aspects, the device is a wireless communication device.

In a seventh aspect, alone or in combination with one or more of the first through sixth aspects, the signal is transmitted to the device via a wireless connection of the device.

Although FIG. 4 shows example blocks of process 400, in some aspects, process 400 includes additional blocks, fewer blocks, different blocks, or differently arranged blocks than those depicted in FIG. 4. Additionally, or alternatively, two or more of the blocks of process 400 may be performed in parallel.

Figure 5:
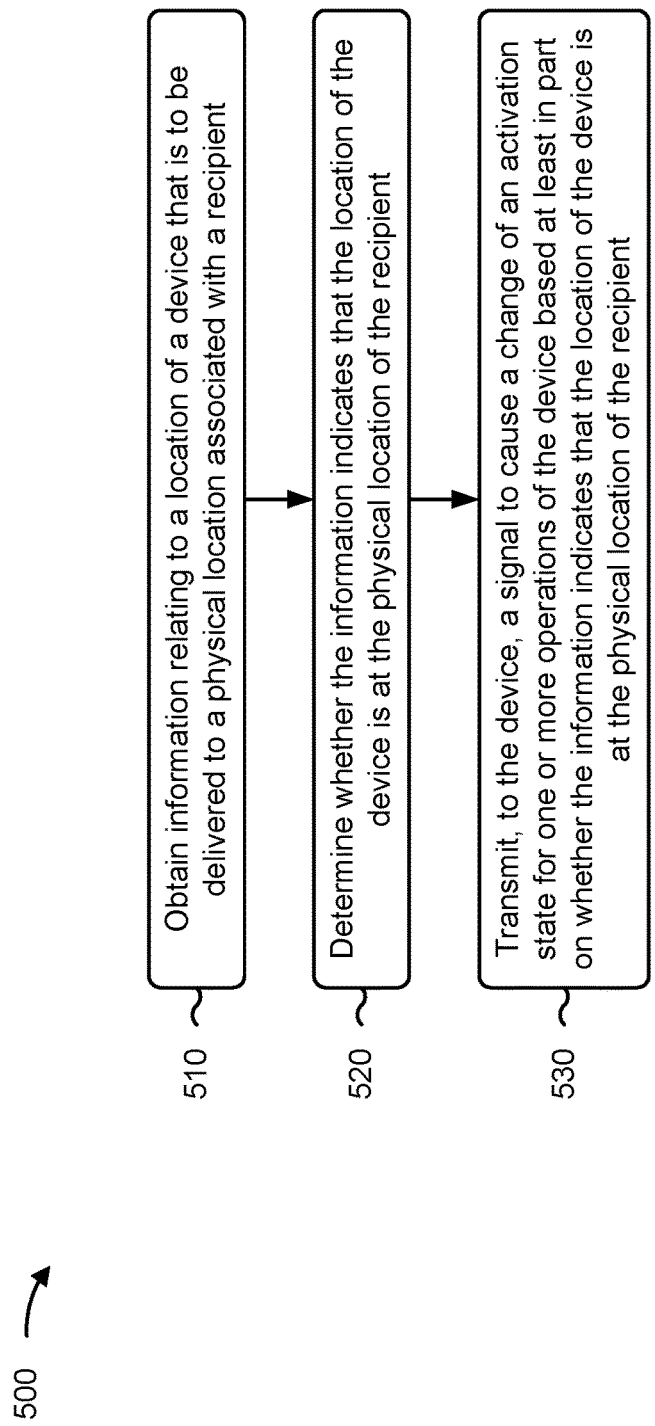

FIG. 5 is a flowchart of an example process 500 associated with remote activation or deactivation of a device. In some aspects, one or more process blocks of FIG. 5 are performed by a server device (e.g., server device 120). In some aspects, one or more process blocks of FIG. 5 are performed by another device or a group of devices separate from or including the server device, such as the device that is to be remotely activated or deactivated (e.g., device 110), a user device (e.g., user device 130), and/or a logistics device (e.g., logistics device 140). Additionally, or alternatively, one or more process blocks of FIG. 5 may be performed by one or more components of device 200, such as processor 210, memory 215, storage component 220, input component 225, output component 230, communication interface 235, and/or sensor 240.

As shown in FIG. 5, process 500 may include obtaining information relating to a location of a device that is to be delivered to a physical location associated with a recipient (block 510). For example, the server device may obtain information relating to a location of a device that is to be delivered to a physical location associated with a recipient, as described above.

As further shown in FIG. 5, process 500 may include determining whether the information indicates that the location of the device is at the physical location of the recipient (block 520). For example, the server device may determine whether the information indicates that the location of the device is at the physical location of the recipient, as described above.

As further shown in FIG. 5, process 500 may include transmitting, to the device, a signal to cause a change of an activation state for one or more operations of the device based at least in part on whether the information indicates that the location of the device is at the physical location of the recipient (block 530). For example, the server device may transmit, to the device, a signal to cause a change of an activation state for one or more operations of the device based at least in part on whether the information indicates that the location of the device is at the physical location of the recipient, as described above.

Process 500 may include additional aspects, such as any single aspect or any combination of aspects described below and/or in connection with one or more other processes described elsewhere herein.

In a first aspect, an activation state of one or more operations of the device are set to be deactivated prior to the signal being transmitted, and the change of the activation state for the one or more operations is an activation of the one or more operations if the information indicates that the location of the device is at the physical location of the recipient.

In a second aspect, an activation state of one or more operations of the device are set to be activated prior to the signal being transmitted, and the change of the activation state for the one or more operations is a deactivation of the one or more operations if the information indicates that the location of the device is not at the physical location of the recipient.

In a third aspect, alone or in combination with one or more of the first and second aspects, process 500 includes receiving, from the device, location information for the device.

In a fourth aspect, alone or in combination with one or more of the first through third aspects, process 500 includes transmitting, to an additional device, a request for shipment tracking information for the device, and receiving, from the additional device, the shipment tracking information for the device.

In a fifth aspect, alone or in combination with one or more of the first through fourth aspects, process 500 includes transmitting, to a user device of the recipient and based at least in part on the information indicating that the location of the device is at the physical location of the recipient, a first communication prompting the recipient to indicate whether the recipient is in possession of the device, and receiving, from the user device of the recipient, a second communication indicating whether the recipient is in possession of the device, where the signal is transmitted further based at least in part on whether the second communication indicates that the recipient is in possession of the device.

In a sixth aspect, alone or in combination with one or more of the first through fifth aspects, at least one of the first communication or the second communication is a text message, an email message, a push notification, or a voice call.

In a seventh aspect, alone or in combination with one or more of the first through sixth aspects, the device is a wireless communication device.

In an eighth aspect, alone or in combination with one or more of the first through seventh aspects, the signal is to be transmitted to the device via a wireless connection of the device.

Although FIG. 5 shows example blocks of process 500, in some aspects, process 500 includes additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with remote activation or deactivation of a device. In some aspects, one or more process blocks of FIG. 6 are performed by the device that is to be remotely activated or deactivated (e.g., device 110). In some aspects, one or more process blocks of FIG. 6 are performed by another device or a group of devices separate from or including the device, such as a server device (e.g., server device 120), a user device (e.g., user device 130), and/or a logistics device (e.g., logistics device 140). Additionally, or alternatively, one or more process blocks of FIG. 6 may be performed by one or more components of device 200, such as processor 210, memory 215, storage component 220, input component 225, output component 230, communication interface 235, and/or sensor 240.

As shown in FIG. 6, process 600 may include transmitting, to a server device, information relating to a location of a device, where the device is to be delivered to a physical location associated with a recipient (block 610). For example, the device may transmit, to a server device, information relating to a location of the device, as described above. In some aspects, the device is to be delivered to a physical location associated with a recipient.

As further shown in FIG. 6, process 600 may include receiving, from the server device, a signal to cause a change of an activation state for one or more operations of the device based at least in part on whether the information indicates that the location of the device is at the physical location of the recipient (block 620). For example, the device may receive, from the server device, a signal to cause a change of an activation state for one or more operations of the device based at least in part on whether the information indicates that the location of the device is at the physical location of the recipient, as described above.

As further shown in FIG. 6, process 600 may include causing the change of the activation state for the one or more operations in accordance with the signal (block 630). For example, the device may cause the change of the activation state for the one or more operations in accordance with the signal, as described above.

Process 600 may include additional aspects, such as any single aspect or any combination of aspects described below and/or in connection with one or more other processes described elsewhere herein.

In a first aspect, an activation state of one or more operations of the device are set to be deactivated prior to the signal being received, and the change of the activation state for the one or more operations is an activation of the one or more operations.

In a second aspect, an activation state of one or more operations of the device are set to be activated prior to the signal being received, and the change of the activation state for the one or more operations is a deactivation of the one or more operations.

In a third aspect, alone or in combination with one or more of the first and second aspects, process 600 includes detecting that a remaining battery life of the device is below a threshold, and causing an activation of the one or more operations, where the change of the activation state of the one or more operations is a deactivation of the one or more operations if the information indicates that the location of the device is not at the physical location of the recipient.

In a fourth aspect, alone or in combination with one or more of the first through third aspects, the information relating to the location of the device is transmitted upon powering on of the device.

In a fifth aspect, alone or in combination with one or more of the first through fourth aspects, process 600 includes detecting that the location of the device has moved a threshold distance away from the physical location of the recipient, and transmitting, to an alarm device associated with the physical location of the recipient, an additional signal to trigger an alarm of the alarm device based at least in part on detecting that the location of the device has moved the threshold distance.

In a sixth aspect, alone or in combination with one or more of the first through fifth aspects, the change of the activation state for the one or more operations is to be caused using one or more first processors of the device, and the one or more operations are to be performed using one or more second processors of the device.

In a seventh aspect, alone or in combination with one or more of the first through sixth aspects, the device is a wireless communication device.

In an eighth aspect, alone or in combination with one or more of the first through seventh aspects, the signal is to be received by the device via a wireless connection of the device.

Although FIG. 6 shows example blocks of process 600, in some aspects, process 600 includes additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method, comprising: obtaining, by a server device, information relating to a location of a device that is to be delivered to a physical location associated with a recipient; transmitting, by the server device to a user device of the recipient and based at least in part on the information indicating that the location of the device is at the physical location of the recipient, a first communication prompting the recipient to indicate whether the recipient is in possession of the device; receiving, by the server device from the user device, a second communication indicating whether the recipient is in possession of the device; and transmitting, by the server device to the device, a signal to cause a change of an activation state of one or more operations of the device based at least in part on whether the second communication indicates that the recipient is in possession of the device.

Aspect 2: The method of Aspect 1, wherein an activation state of one or more operations of the device are set to be deactivated prior to the signal being transmitted, and wherein the change of the activation state for the one or more operations is an activation of the one or more operations if the second communication indicates that the recipient is in possession of the device.

Aspect 3: The method of Aspect 1, wherein an activation state of one or more operations of the device are set to be activated prior to the signal being transmitted, and wherein the change of the activation state for the one or more operations is a deactivation of the one or more operations if the second communication indicates that the recipient is not in possession of the device.

Aspect 4: The method of any of Aspects 1-3, wherein obtaining the information relating to the location of the device comprises: receiving, from the device, location information for the device.

Aspect 5: The method of any of Aspects 1-4, wherein obtaining the information relating to the location of the device comprises: transmitting, to an additional device, a request for shipment tracking information relating to the device; and receiving, from the additional device, the shipment tracking information relating to the device.

Aspect 6: The method of any of Aspects 1-5, wherein at least one of the first communication or the second communication is a text message, an email message, a push notification, or a voice call.

Aspect 7: The method of any of Aspects 1-6, wherein the device is a wireless communication device.

Aspect 8: The method of any of Aspects 1-7, wherein the signal is transmitted to the device via a wireless connection of the device.

Aspect 9: A method, comprising: obtaining, by a server device, information relating to a location of a device that is to be delivered to a physical location associated with a recipient; determining, by the server device, whether the information indicates that the location of the device is at the physical location of the recipient; and transmitting, by the server device, to the device, a signal to cause a change of an activation state for one or more operations of the device based at least in part on whether the information indicates that the location of the device is at the physical location of the recipient.

Aspect 10: The method of Aspect 9, wherein an activation state of one or more operations of the device are set to be deactivated prior to the signal being transmitted, and wherein the change of the activation state for the one or more operations is an activation of the one or more operations if the information indicates that the location of the device is at the physical location of the recipient.

Aspect 11: The method of Aspect 9, wherein an activation state of one or more operations of the device are set to be activated prior to the signal being transmitted, and wherein the change of the activation state for the one or more operations is a deactivation of the one or more operations if the information indicates that the location of the device is not at the physical location of the recipient.

Aspect 12: The method of any of Aspects 9-11, wherein obtaining the information relating to the location of the device comprises: receiving, from the device, location information for the device.

Aspect 13: The method of any of Aspects 9-12, wherein obtaining the information relating to the location of the device comprises: transmitting, to an additional device, a request for shipment tracking information for the device; and receiving, from the additional device, the shipment tracking information for the device.

Aspect 14: The method of any of Aspects 9-13, further comprising: transmitting, to a user device of the recipient and based at least in part on the information indicating that the location of the device is at the physical location of the recipient, a first communication prompting the recipient to indicate whether the recipient is in possession of the device; and receiving, from the user device of the recipient, a second communication indicating whether the recipient is in possession of the device, wherein the signal is transmitted further based at least in part on whether the second communication indicates that the recipient is in possession of the device.

Aspect 15: The method of Aspect 14, wherein at least one of the first communication or the second communication is a text message, an email message, a push notification, or a voice call.

Aspect 16: The method of any of Aspects 9-15, wherein the device is a wireless communication device.

Aspect 17: The method of any of Aspects 9-16, wherein the signal is to be transmitted to the device via a wireless connection of the device.

Aspect 18: A method, comprising: transmitting, by a device, to a server device, information relating to a location of the device, wherein the device is to be delivered to a physical location associated with a recipient; receiving, from the server device, a signal to cause a change of an activation state for one or more operations of the device based at least in part on whether the information indicates that the location of the device is at the physical location of the recipient; and causing, by the device, the change of the activation state for the one or more operations in accordance with the signal.

Aspect 19: The method of Aspect 18, wherein an activation state of one or more operations of the device are set to be deactivated prior to the signal being received, and wherein the change of the activation state for the one or more operations is an activation of the one or more operations.

Aspect 20: The method of Aspect 18, wherein an activation state of one or more operations of the device are set to be activated prior to the signal being received, and wherein the change of the activation state for the one or more operations is a deactivation of the one or more operations.

Aspect 21: The method of any of Aspects 18-20, further comprising: detecting that a remaining battery life of the device is below a threshold; and causing an activation of the one or more operations, wherein the change of the activation state of the one or more operations is a deactivation of the one or more operations if the information indicates that the location of the device is not at the physical location of the recipient.

Aspect 22: The method of any of Aspects 18-21, wherein the information relating to the location of the device is transmitted upon powering on of the device.

Aspect 23: The method of any of Aspects 18-22, further comprising: detecting that the location of the device has moved a threshold distance away from the physical location of the recipient; and transmitting, to an alarm device associated with the physical location of the recipient, an additional signal to trigger an alarm of the alarm device based at least in part on detecting that the location of the device has moved the threshold distance.

Aspect 24: The method of any of Aspects 18-23, wherein the change of the activation state for the one or more operations is to be caused using one or more first processors of the device, and wherein the one or more operations are to be performed using one or more second processors of the device.

Aspect 25: The method of any of Aspects 18-24, wherein the device is a wireless communication device.

Aspect 26: The method of any of Aspects 18-25, wherein the signal is to be received by the device via a wireless connection of the device.

Aspect 27: An apparatus for wireless communication at a device, comprising a processor; memory coupled with the processor; and instructions stored in the memory and executable by the processor to cause the apparatus to perform the method of one or more of Aspects 1-8.

Aspect 28: A device for wireless communication, comprising a memory and one or more processors coupled to the memory, the one or more processors configured to perform the method of one or more of Aspects 1-8.

Aspect 29: An apparatus for wireless communication, comprising at least one means for performing the method of one or more of Aspects 1-8.

Aspect 30: A non-transitory computer-readable medium storing code for wireless communication, the code comprising instructions executable by a processor to perform the method of one or more of Aspects 1-8.

Aspect 31: A non-transitory computer-readable medium storing a set of instructions for wireless communication, the set of instructions comprising one or more instructions that, when executed by one or more processors of a device, cause the device to perform the method of one or more of Aspects 1-8.

Aspect 32: An apparatus for wireless communication at a device, comprising a processor; memory coupled with the processor; and instructions stored in the memory and executable by the processor to cause the apparatus to perform the method of one or more of Aspects 9-17.

Aspect 33: A device for wireless communication, comprising a memory and one or more processors coupled to the memory, the one or more processors configured to perform the method of one or more of Aspects 9-17.

Aspect 34: An apparatus for wireless communication, comprising at least one means for performing the method of one or more of Aspects 9-17.

Aspect 35: A non-transitory computer-readable medium storing code for wireless communication, the code comprising instructions executable by a processor to perform the method of one or more of Aspects 9-17.

Aspect 36: A non-transitory computer-readable medium storing a set of instructions for wireless communication, the set of instructions comprising one or more instructions that, when executed by one or more processors of a device, cause the device to perform the method of one or more of Aspects 9-17.

Aspect 37: An apparatus for wireless communication at a device, comprising a processor; memory coupled with the processor; and instructions stored in the memory and executable by the processor to cause the apparatus to perform the method of one or more of Aspects 18-26.

Aspect 38: A device for wireless communication, comprising a memory and one or more processors coupled to the memory, the one or more processors configured to perform the method of one or more of Aspects 18-26.

Aspect 39: An apparatus for wireless communication, comprising at least one means for performing the method of one or more of Aspects 18-26.

Aspect 40: A non-transitory computer-readable medium storing code for wireless communication, the code comprising instructions executable by a processor to perform the method of one or more of Aspects 18-26.

Aspect 41: A non-transitory computer-readable medium storing a set of instructions for wireless communication, the set of instructions comprising one or more instructions that, when executed by one or more processors of a device, cause the device to perform the method of one or more of Aspects 18-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a server device, information relating to a location of a device that is to be delivered to a physical location associated with a recipient;
   obtaining, by the server device, movement information indicating movement of the device;
   transmitting, by the server device to a user device of the recipient and based at least in part on the information indicating that the location of the device is at the physical location of the recipient, a first communication prompting the recipient to indicate whether the recipient is in possession of the device;
   receiving, by the server device from the user device, a second communication indicating whether the recipient is in possession of the device; and
   transmitting, by the server device to the device, a signal to cause the device to change an activation state of one or more operations of the device based at least in part on whether the second communication indicates that the recipient is in possession of the device and based at least in part on whether the movement information indicates the recipient is in possession of the device,
   wherein the device changing the activation state comprises the device changing an ability of the device to power on, to connect to a network, or to display content on a display of the device.

2. The method of claim 1, wherein the activation state of the one or more operations of the device is set to be deactivated prior to the signal being transmitted, and
   wherein the device changing the activation state for the one or more operations comprises the device activating the one or more operations if the second communication indicates that the recipient is in possession of the device.

3. The method of claim 1, wherein the activation state of the one or more operations of the device is set to be activated prior to the signal being transmitted, and
   wherein the device changing the activation state for the one or more operations comprises the device deactivating the one or more operations if the second communication indicates that the recipient is not in possession of the device.

4. The method of claim 1, wherein obtaining the information relating to the location of the device comprises:
   receiving, from the device, location information for the device.

5. The method of claim 1, wherein obtaining the information relating to the location of the device comprises:
   transmitting, to an additional device, a request for shipment tracking information relating to the device; and
   receiving, from the additional device, the shipment tracking information relating to the device.

6. The method of claim 1, wherein at least one of the first communication or the second communication is a text message, an email message, a push notification, or a voice call.

7. The method of claim 1, wherein the device is a wireless communication device.

8. The method of claim 1, wherein the signal is transmitted to the device via a wireless connection of the device.

9. A server device, comprising:
   one or more memories; and
   one or more processors, coupled to the one or more memories, configured to:
      obtain information relating to a location of a device that is to be delivered to a physical location associated with a recipient;

obtain movement information indicating movement of the device;

determine whether the information indicates that the location of the device is at the physical location of the recipient;

determine whether the movement information indicates the recipient is in possession of the device; and transmit, to the device, a signal to cause the device to change an activation state for one or more operations of the device based at least in part on whether the information indicates that the location of the device is at the physical location of the recipient and whether the movement information indicates the recipient is in possession of the device, wherein the device changing the activation state comprises the device changing an ability of the device to power on, to connect to a network, or to display content on a display of the device.

10. The server device of claim 9, wherein the activation state of the one or more operations of the device is set to be deactivated prior to the signal being transmitted, and wherein the device changing the activation state for the one or more operations comprises the device activating the one or more operations if the information indicates that the location of the device is at the physical location of the recipient.

11. The server device of claim 9, wherein the activation state of the one or more operations of the device is set to be activated prior to the signal being transmitted, and wherein the device changing the activation state for the one or more operations comprises the device deactivating the one or more operations if the information indicates that the location of the device is not at the physical location of the recipient.

12. The server device of claim 9, wherein the one or more processors, to obtain the information relating to the location of the device, are configured to:

receive, from the device, location information for the device.

13. The server device of claim 9, wherein the one or more processors, to obtain the information relating to the location of the device, are configured to:

transmit, to an additional device, a request for shipment tracking information for the device; and receive, from the additional device, the shipment tracking information for the device.

14. The server device of claim 9, wherein the one or more processors are further configured to:

transmit, to a user device of the recipient and based at least in part on the information indicating that the location of the device is at the physical location of the recipient, a first communication prompting the recipient to indicate whether the recipient is in possession of the device; and receive, from the user device of the recipient, a second communication indicating whether the recipient is in possession of the device, wherein the signal is transmitted further based at least in part on whether the second communication indicates that the recipient is in possession of the device.

15. The server device of claim 14, wherein at least one of the first communication or the second communication is a text message, an email message, a push notification, or a voice call.

16. The server device of claim 9, wherein the device is a wireless communication device.

17. The server device of claim 9, wherein the signal is to be transmitted to the device via a wireless connection of the device.

18. A non-transitory computer-readable medium storing a set of instructions, the set of instructions comprising:

one or more instructions that, when executed by one or more processors of a device, cause the device to:

transmit, to a server device, information relating to a location of the device, wherein the device is to be delivered to a physical location associated with a recipient;

transmit, to the server device, movement information indicating movement of the device;

receive, from the server device, a signal to cause a change of an activation state for one or more operations of the device based at least in part on whether the information indicates that the location of the device is at the physical location of the recipient and whether the movement information indicates the recipient is in possession of the device; and change the activation state for the one or more operations in accordance with the signal, wherein the device changing the activation state comprises the device changing an ability of the device to power on, to connect to a network, or to display content on a display of the device.

19. The non-transitory computer-readable medium of claim 18, wherein the activation state of the one or more operations of the device is set to be deactivated prior to the signal being received, and wherein the device changing the activation state for the one or more operations comprises the device activating the one or more operations.

20. The non-transitory computer-readable medium of claim 18, wherein the activation state of the one or more operations of the device is set to be activated prior to the signal being received, and wherein the the device changing the activation state for the one or more operations comprises the device deactivating the one or more operations.

21. The non-transitory computer-readable medium of claim 18, wherein the one or more instructions further cause the device to:

detect that a remaining battery life of the device is below a threshold; and activate the one or more operations, wherein the device changing the activation state of the one or more operations comprises the device deactivating the one or more operations if the information indicates that the location of the device is not at the physical location of the recipient.

22. The non-transitory computer-readable medium of claim 18, wherein the information relating to the location of the device is transmitted upon powering on of the device.

23. The non-transitory computer-readable medium of claim 18, wherein the one or more instructions further cause the device to:

detect that the location of the device has moved a threshold distance away from the physical location of the recipient; and transmit, to an alarm device associated with the physical location of the recipient, an additional signal to trigger an alarm of the alarm device based at least in part on detecting that the location of the device has moved the threshold distance.

24. The non-transitory computer-readable medium of claim 18, wherein the device changing the activation state for the one or more operations is caused using one or more first processors of the device, and
wherein the one or more operations are to be performed using one or more second processors of the device.

25. The non-transitory computer-readable medium of claim 18, wherein the device is a wireless communication device.

26. The non-transitory computer-readable medium of claim 18, wherein the signal is to be received by the device via a wireless connection of the device.

27. An apparatus, comprising:
means for transmitting, to a server device, information relating to a location of the apparatus,
wherein the apparatus is to be delivered to a physical location associated with a recipient;
means for transmitting, to the server device, movement information indicating movement of the apparatus;
means for receiving, from the server device, a signal to cause the apparatus to change an activation state for one or more operations of the apparatus based at least in part on whether the information indicates that the location of the apparatus is at the physical location of the recipient and whether the movement information indicates the recipient is in possession of the apparatus; and
means for changing the activation state for the one or more operations in accordance with the signal,
wherein changing the activation state comprises changing an ability of the apparatus to power on, to connect to a network, or to display content on a display of the apparatus.

28. The apparatus of claim 27, wherein the information relating to the location of the apparatus is to be transmitted upon powering on of the apparatus.

29. The apparatus of claim 27, wherein changing the activation state for the one or more operations is caused using one or more first processors of the apparatus, and
wherein the one or more operations are to be performed using one or more second processors of the apparatus.

30. The apparatus of claim 27, wherein the signal is to be received by the apparatus via a wireless connection of the apparatus.

* * * * *